Nov. 23, 1965    A. F. TEITSCHEID ETAL    3,219,147
TORQUE AMPLIFIER

Filed Jan. 4, 1965    2 Sheets-Sheet 2

INVENTORS.
ALFRED F. TEITSCHEID
CLIFFORD R. DALY
BY Harry M. Saragovitz,
Edward J. Kelly, Herbert Berl
& S. Dubroff

ATTORNEYS

United States Patent Office 3,219,147
Patented Nov. 23, 1965

3,219,147
TORQUE AMPLIFIER
Alfred F. Teitscheid, Wharton, and Clifford R. Daly, Teaneck, N.J., assignors to the United States of America as represented by the Secretary of the Army
Filed Jan. 4, 1965, Ser. No. 423,401
6 Claims. (Cl. 185—37)

(Granted under Title 35, U.S. Code (1952), sec. 266)

The invention described herein may be manufactured and used by or for the government for governmental purposes without the payment to me of any royalty thereon.

This invention relates to a controlled torque amplifier, and more particularly, to a mechanical torque amplifier having a control mechanism or timing movement with the entire arrangement particularly useful in rocket apparatus and the like.

The invention relates to accurate control of a large number of switching functions which has been a problem area with the advent of guided missiles and rocketry, particularly when the equipment is to be subjected to unusually cold temperature conditions where movement lubricant has a tendency to harden or otherwise become a resistance obstacle.

One of the objects of the invention is to provide an accurately controlled mechanical driving media for operation of large or heavy loads or switching functions.

Another object of the invention is to provide such an arrangement which is operable at extreme temperature conditions.

A further object of the invention is to provide such driving media with built-in mechanical power, thus eliminating otherwise costly items such as batteries or other electrical power source means.

A still further object of the invention is to provide such driving media with a maximum power source and a load support output shaft interconnected by a control mechanism having means for preventing erratic or uncontrolled operation of the arrangement.

In one aspect of the invention the mechanism has a mechanical power spring for driving a load to be supported on an output shaft, a power drum connected to the spring and driving a control shaft to which speed control means are geared, and a control band within and adjacent the drum, the band having one end connected to the control shaft and another end connected to the output shaft.

In another aspect of the invention an overspeed brake is employed to retard runaway of the drum under small load conditions.

These and other objects, features and advantages will become apparent from the following description and accompanying drawings in which.

Figure 1:
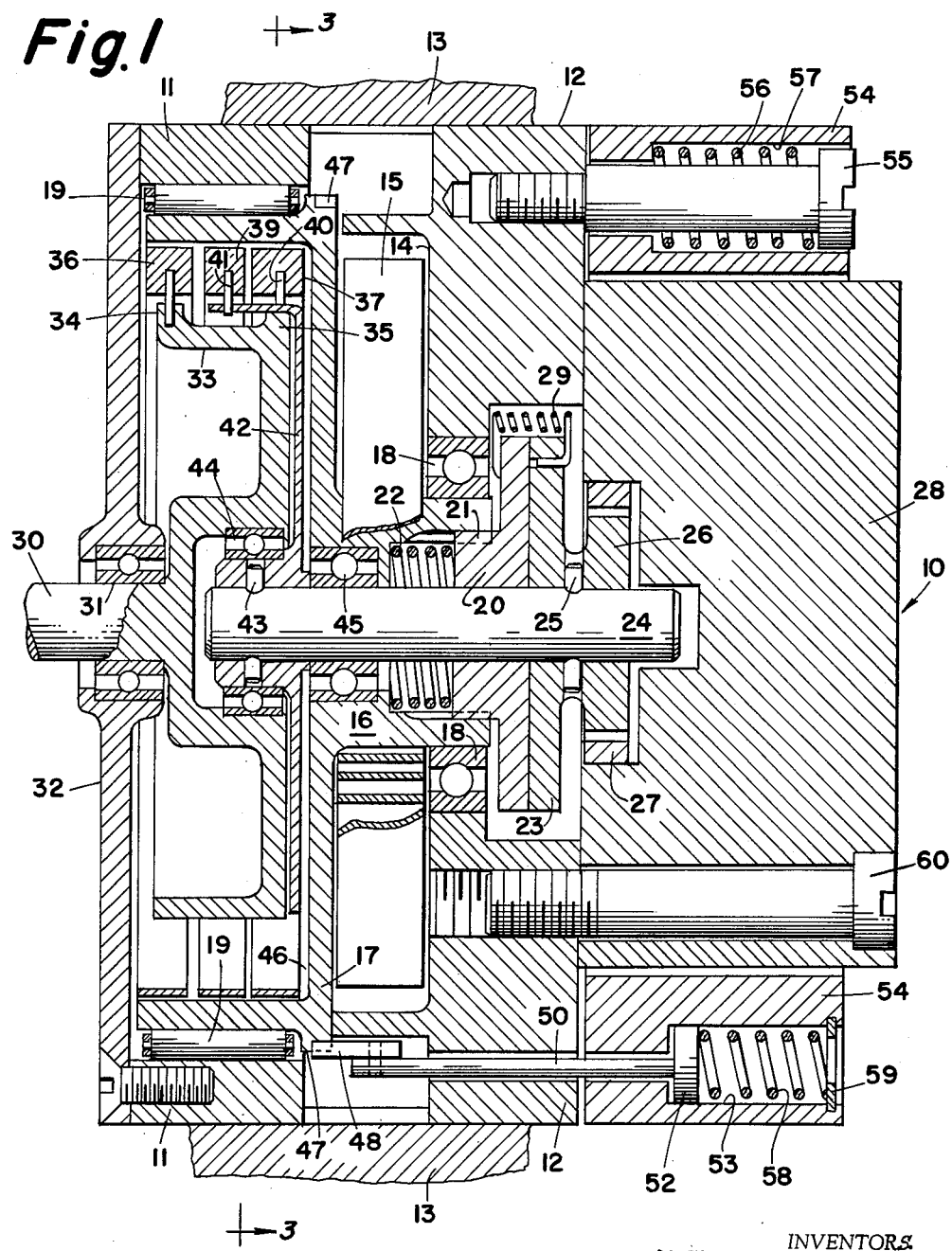
FIG. 1 is a longitudinal sectional view, partially broken away, of a torque amplifying structure embodying the principles of the invention.

The torque amplifying structure shown generally at 10 (FIG. 1) in an assembled condition has certain cylindrical support portions 11, 12 which preferably are securable within a suitable mating cylindrical rocket housing annulus 13, as by any form of conventional securing means (not shown).

Support portion 12 has a forwardly facing recess 14 in which is positioned a prewindable mechanical power spring 15. The inner end of spring 15 is appropriately connected to the hub portion 16 of power drum 17 which is journalled for rotation in support bearings 18, 19. A drive clutch plate 20 has its outer hub surface matingly splined at 21 to the rearward inner surface of drum hub 16. Hub 16 is suitably recessed to provide a rearwardly facing flange against which clutch spring 22 seats. Thus, clutch plate 20 is normally biased in engagement with driven clutch member 23. Clutch 23 is secured by pin or rod 25 to control shaft 24 for simultaneous operative rotation. Integral with driven clutch member 23 is a toothed gear 26 in engagement with a first gear 27 of a predetermined gear train mechanism of the precise speed control unit 28 by which the predetermined maximum drive power of spring is regulated in controlling the rotary speed of control shaft 24. An overspeed brake, preferably in the form of a coil spring 29 having its ends connected to the respective clutch elements 20, 23, is provided to retard any tendency of the power spring or drum to run away under minimum load conditions upon output shaft 30.

Figure 2:
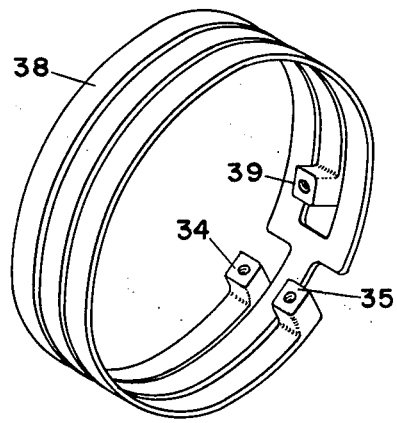
FIG. 2 is a perspective view of the control band employed in the FIG. 1 arrangement.
Figure 3:
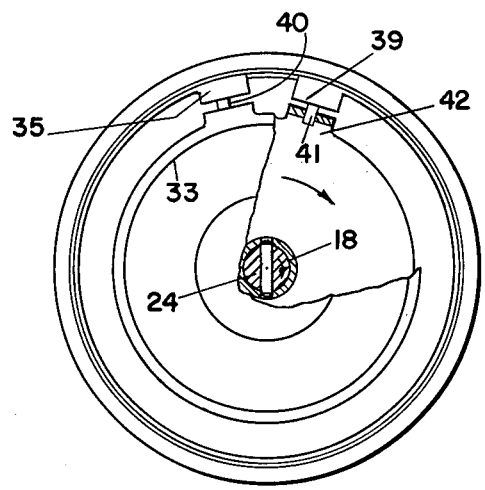
FIG. 3 is a transverse sectional view, partially broken away, taken along line 3—3 of FIG. 1.

Output shaft 30, appropriately journalled in bearing 31 of cover plate 32, is adapted to support a multiplicity of heavy switching elements and has a rearmost outwardly extending flange means terminating in annulus 33 whose outer periphery is bifurcated defining longitudinally spaced portions 34, 35 to which respective spaced connecting portions 36, 37 of one end of control band 38 (FIGS. 1, 2) are connected by suitable means such as dowel pins 40, 40. The control band 38 is somewhat flexible and has a length of slightly short of two revolutions, the spaced portions 36, 37 being joined to the other end 39 at substantially the band's midlength. The band other end 39 is connected by central dowel pin 41 to a forwardly extending peripheral flange of control arm 42. The hub portion of arm 42 is secured to the forward portion of control shaft 24 by pin or rod 43. Appropriate bearings 44 and 45 are provided respectively, between the control arm hub and the arm of flange of output shaft 30, and between the control shaft 24 and the power drum hub 16. The drum 17 is open at the forward end to define a recess 46 in which the control band 38 and associated parts are positioned, so that upon predetermined rotary movement of control shaft 24 and arm 42 as indicated by the arrows in FIG. 3, the peripheral edge of the band 38 will be expanded to frictionally engage the inner periphery of the drum 17, whereupon the rotating drum will drive the output shaft 30 until the frictional engagement with band 38 is discontinued. Should the drum and output shaft 30 tend to substantially outrun the rotational speed of control arm 42 and shaft 24, the band 38 will contract to interrupt the aforementioned frictional engagement until such time as it is reengaged by continued rotation of shaft 24 and arm 42.

Figure 4:
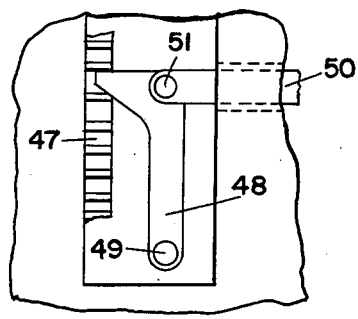
FIG. 4 is a side elevationel view with certain parts removed to show a preferred form of latching arrangement for the power drum.

A portion of the drum periphery is raised or otherwise provided with a ring gear 47 which is normally engaged by actuator pawl 48, pivotally mounted at 49 (FIG. 4), when the parts are in their initial or rest position. Actuator arm 50 has one forward end pivotally connected at 51 to pawl 48 and its other end provided with a head 52 slidably mounted in a rearwardly opening recess 53 in an annular, acceleration actuator mass 54 normally secured to and biased forwardly against support portion 12 by bolt or post means 55 and a spring 56 which is appropriately positioned in recess 57 of actuator mass 54. Spring 58, held within recess 53 by retaining disk 59, normally urges or biases actuator arm 50 and its head 52 forwardly so that pawl 48 locks the rotary position of drum 17 and its ring gear 47. Bolt means 60 maintains the speed control unit 28 rigidly secured to support portion 12.

With the prewound power spring and the associated parts in position as shown in FIG. 1, rapid forward motion of rocket housing annulus 13 will tend to move all parts of the assembly forward relative to actuator mass 54. The relative rearward motion of mass 54 will initially compress springs 56 and 58, as well as drive or pull the actuator arm 50 rearwardly a sufficient distance to pivot the pawl 48 out of engagement with ring gear 47, thereby releasing the power drum for predetermined rotary movement. Any suitable keeper means (not shown) may be employed to prevent the arm 50 and head 52 from undesirable subsequent, forward relative movement after pawl 48 has been withdrawn from its latching position.

It is contemplated that various modifications, alterations or changes may be resorted to without departing from the scope of the invention as defined in the appended claims.

We claim:

1. In a mechanism having a mechanical power spring for driving a load, and an output shaft for supporting said load,
    a power drum connected to said spring,
    a control shaft driven by said drum,
    a speed control means geared to said control shaft, and
    a control band within and adjacent said drum and having one end connected to said control shaft and another end connected to said output shaft,
    so constructed and arranged that said power spring will first drive said control shaft for expanding said control band to frictionally engage said drum, and then subsequently drive said output shaft directly through said drum and band, with said speed control means at all times controlling the output speed of said output shaft.

2. The mechanism of claim 1 wherein releasable latching means are provided for normally restraining movement of said drum.

3. In a mechanism having a prewindable mechanical power spring for driving a load, and an output shaft for supporting said load,
    a power drum connected to said spring,
    a drive clutch plate driven by said drum,
    a clutch driven by said clutch plate and having a gear rotatable therewith,
    means biasingly engaging said clutch plate with said clutch,
    a precise speed control unit having a gear train meshing with said gear,
    a control shaft secured to said clutch,
    a control arm secured to said control shaft and extending within said drum, and
    a control band positioned within and adjacent said drum and having one end connected to said control arm and another end connected to said output shaft,
    so constructed and arranged that said power spring will first drive said control arm for expanding said band to frictionally engage said drum, and then subsequently drive said output shaft directly through said drum and band, with said speed control unit at all times controlling the output speed of said output shaft.

4. The mechanism of claim 3 wherein releasable latching means are provided for normally restraining movement of said drum.

5. The mechanism of claim 3 in which an overspeed brake is employed intermediate said clutch and clutch plate to retard runaway of said drum under small load conditions.

6. In combination with the mechanism defined in claim 4, a housing extending around at least a portion of said mechanism and capable of receiving a forward acceleration force, said mechanism having a support secured to said housing, post means secured to and extending rearwardly from said support, an acceleration actuator mass slidably mounted on said post and having means for releasing said latching means, and a spring normally biasing said mass forwardly along said post,
    so constructed and arranged that when said housing is imparted with said forward acceleration force said mass will be moved rearwardly along said post to release said latching means.

No references cited.

EDGAR W. GEOGHEGAN, *Primary Examiner.*